United States Patent [19]

Witt, III

[11] Patent Number: 4,960,325
[45] Date of Patent: Oct. 2, 1990

[54] LIGHT PROTECTION APPARATUS AND PROTECTIVE ELEMENT SUBASSEMBLY THEREFOR

[76] Inventor: Frank A. Witt, III, 918 Pond Dr., West Columbia, S.C. 29169

[21] Appl. No.: 209,848

[22] Filed: Jun. 22, 1988

[51] Int. Cl.$^5$ .............................................. G02F 1/01
[52] U.S. Cl. ................................... 350/363; 350/501; 350/642
[58] Field of Search ............... 350/1.6, 353, 354, 363, 350/501, 642

[56] References Cited

U.S. PATENT DOCUMENTS

| | | | |
|---|---|---|---|
| 3,301,624 | 1/1967 | Morriss | 350/363 |
| 3,455,627 | 7/1969 | Letter | 350/363 |
| 3,734,592 | 5/1973 | Stankay et al. | 350/363 |

Primary Examiner—Bruce Y. Arnold
Assistant Examiner—Ronald M. Kachmarik

Attorney, Agent, or Firm—McAndrews, Held & Malloy, Ltd.

[57] ABSTRACT

A light protection apparatus receives a beam of light having both a harmless light component and a harmful light component. The apparatus includes a housing having a forward end and a rear viewing end. A view aperture is located near the viewing end and receives the beam of light. An objective lens passes light onto a reflective device within the housing. The reflective device reflects the beam of light onto a partially reflective surface. The partially reflective surface includes an absorbing portion and a reflective pellicle surface. The reflective pellicle surface reflects the harmless light component to an eye piece lens. The harmful component, however, destroys the pellicle surface and the harmful light is transmitted to the absorbing portion and thus no reflection occurs. A cartridge carries the pellicle surface and is threadably removable with respect to the housing for replacement of the cartridge. In addition, a laser detector detects the presence of laser light and signals the user accordingly.

4 Claims, 1 Drawing Sheet

LIGHT PROTECTION APPARATUS AND PROTECTIVE ELEMENT SUBASSEMBLY THEREFOR

BACKGROUND OF THE INVENTION

In a principal aspect, the present invention relates to a light protection apparatus and, more particularly, to a protective element subassembly for use in a light protection apparatus. The light protection apparatus receives light having a harmless component and an intermittent or constant wave harmful component and is constructed to shield the viewer from exposure to the harmful component of the beam of light.

A particular harmful component of light is produced by a laser. Defined as any device that produces or amplifies ultraviolet, visible, or infrared radiation by the process of controlled stimulated emission, the word "laser" is an acronym for Light Amplification by Stimulated Emission of Radiation.

Laser light differs from conventional light in two principal aspects. First, a laser light pulse is substantially monochromatic as contrasted with the normal visible light spectrum which contains a wide variety of wavelengths. Second, a beam of laser light undergoes very little divergence as it emanates from its source. In contrast to most radiation, in which the intensity is proportional to the inverse square of the distance from the point of radiation, the intensity of laser light decreases substantially linearly as a function of distance from the source. Accordingly, laser light can be harmful at far greater distances than conventional light.

In military applications, laser use runs the gamut from blinding devices, directing gunfire, designating targets for laser guided munitions, communications, training aids, fiber optics, scoring systems, landing systems, etc. Thus, a multitude of laser applications exist in a military environment. Hence, laser emissions may be encountered by the combatant, and must be protected against. In contrast, civilian uses of laser light are more controlled. Civilian applications for lasers include welding, cutting, surveying, scanning, communications and medical use.

Because the military laser environment is often not subject to control, protecting against military lasers are extremely difficult. Whether on the battlefield, at sea or in the air, a military combatant must be protected against harmful light.

Light protection apparatus, especially as protection against laser light, are typically provided with filters that attempt to filter the harmful component of a beam of light (laser) from the harmless component of a beam of light (ordinary light). These filter mechanisms suffer the disadvantage that the harmless component of the beam of light is often greatly filtered, often as much as 98% of visible light. Thus, light protection apparatus using filters tend to obscure the user's field of vision. However, the military combatant can ill afford to be burdened with a diminished view of his hostile environment. Also with the advent of the tunable lasers in the battlefield arena, filters alone are insufficient to block the multi frequencies. Thus, filter type light protection apparatus suffer serious drawbacks in military applications.

Accordingly, protection of personnel from laser light is a primary importance. It is advantageous to minimize the amount of non-harmful light screened from the viewer while protecting the viewer from harmful light such as laser. The present invention constitutes an improved light protection apparatus and a protective element subassembly therefore that seeks to overcome the problems discussed while at the same time providing a simple, easily constructed design that is readily adaptable to a variety of light protection needs.

SUMMARY OF THE INVENTION

Briefly, the present invention comprises a light protection apparatus and more particularly to a protective element subassembly. In a light protection apparatus for receiving a beam of light having a harmless component and a harmful component, the apparatus has a light protection housing, a view aperture, objective lens means, a reflective means, and a protective element subassembly. The light protection housing has a forward end, a viewing end and a housing shell. The view aperture is located near the viewing end and receives the beam of light. An objective lens means is located between the view aperture and the reflective means and is received in the housing shell. The objective lens means is constructed and arranged for directing the beam of light toward the reflective means. The reflective means can be accomplished by using a reflective prism, a mirror, or the like, and reflects the focused beam of light onto a partially reflective surface.

The protective element subassembly has an absorbing portion and a reflective pellicle surface. The reflective pellicle surface is located between the absorbing portion of the subassembly and the reflective means. Typically, the reflective pellicle surface has a thickness of less than two microns.

The reflective pellicle surface is constructed and arranged to reflect the harmless light to an eyepiece lens means. Any incident laser beam is focused to a point on the partially absorbing pellicle, resulting in destruction of that point on the surface on which it is incident.

The apparatus is further provided with detection means for detecting the presence of laser light. The detection means can then signal the user by means such as an LED mounted within the tube.

All light is partially reflected from the pellicle surface to an eyepiece lens means which refocuses that light for viewing in substantially undistorted form.

Thus, light enters the apparatus at the viewing end of the housing shell. The light is then received by the view aperture and passes through the objective lens means. The objective lens means focuses the light onto a point on the reflective pellicle surface, via the prism, of the protective element subassembly. Light of harmless intensity is reflected by the pellicle surface to the eyepiece lens means and is then refocused for viewing.

A portion of the light is always absorbed by the pellicle. When the intensity of incident light reaches a threshold value, the pellicle surface is locally destroyed, resulting in the harmful beam passing through the pellicle, rather than being reflected to the eyepiece, transmitted through the hole formed in the pellicle, thus preventing transmission of the beam to the eye of the protected individual.

Thus, it is an object of the present invention to provide a light protection apparatus that does not employ traditional filtering mechanisms.

Another object of the present invention is to provide a light protection apparatus that enables the user to view harmless components of incoming light with substantially little distortion or color inhibition.

Yet another object of the present invention is to provide a light protection apparatus that is useful in protecting the viewer from a plurality of intermittent or continuous harmful components of light.

Yet another object of the present invention is to provide a light protection apparatus that can be specifically designed to protect against tuneable military wavelengths of harmful light.

Yet another object of the present invention is to provide a light protection apparatus that can be specifically designed to protect against laboratory and commercial environments.

Yet a further object of the present invention is to provide a light protection apparatus that permits a large fraction of normal light to pass.

Yet another object of the present invention is to provide a light protection apparatus having few specialized parts.

Yet another object of the present invention is to provide a light protection apparatus having rapid response time, typically in a few nanoseconds.

Yet another object of the present invention is to provide a light protection apparatus that is lightweight and can be easily removed from the viewer's head.

These and other objects, advantages and features of the present invention will be apparent from the detailed description that follows.

BRIEF DESCRIPTION OF THE DRAWINGS

In the detailed description that follows, reference will be made to the drawing comprised of the following figures.

DETAILED DESCRIPTION OF THE PREFERRED EMBODIMENTS

Figure 1:
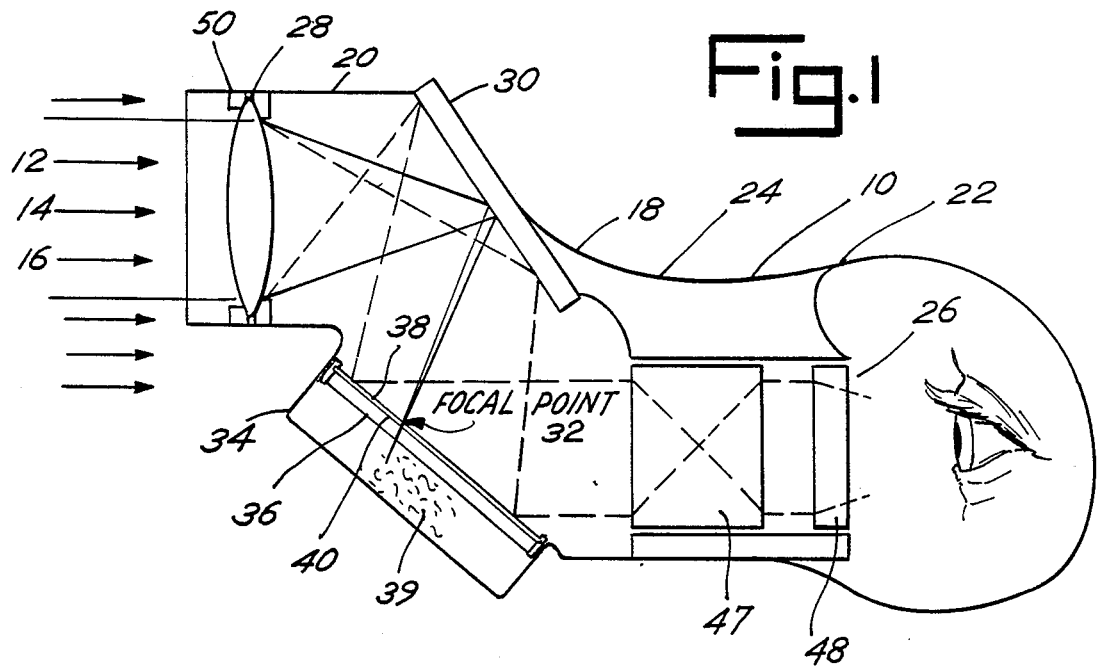
FIG. 1 is a schematic view of a light protection apparatus incorporating a preferred embodiment of the present invention.
Figure 2:
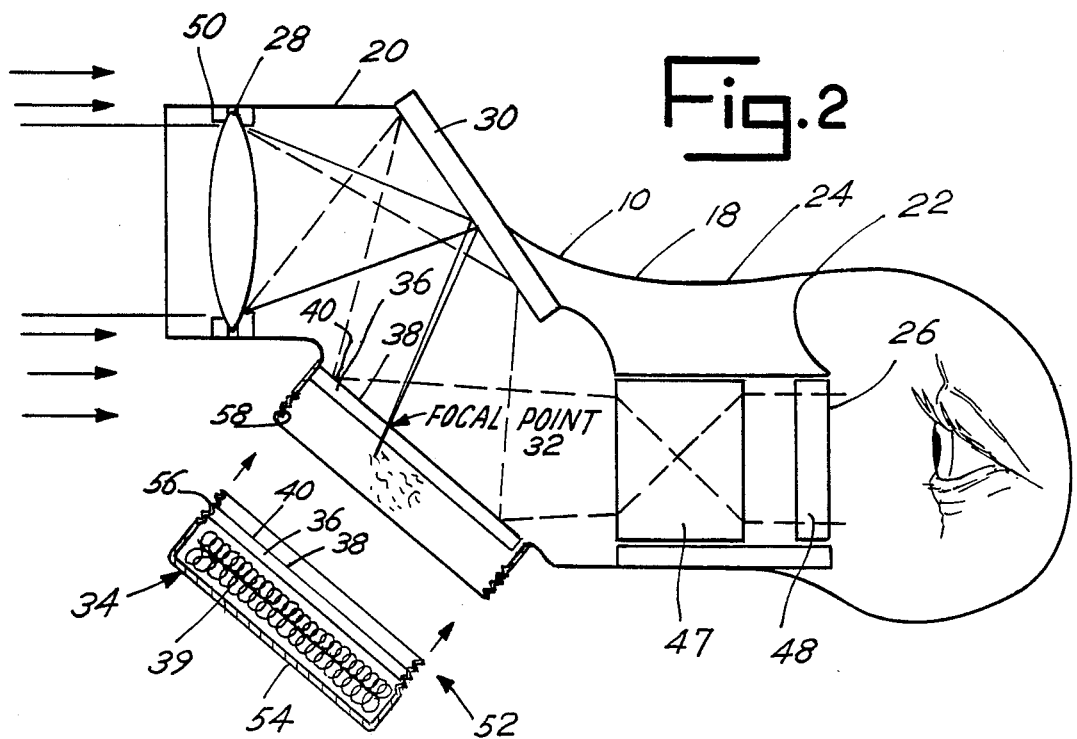
FIG. 2 is a schematic view of the working parts of a second embodiment of the present invention.

FIG. 1 depicts a specific, preferred embodiment of the invention. FIG. 2 depicts the working parts of a second, preferred embodiment of the invention. Referring therefore to FIG. 1, a light protection apparatus 10 is shown for receiving a beam of light 12 having a harmless component 14 and an intermittent harmful component 16. The apparatus 10 has a light protection housing 18 having a forward end 20, a viewing end 22, and a housing shell 24. The housing shell 24 is adapted to receive the beam of light 12.

A view aperture 26 is located proximate to the viewing end 22 of the light protection housing 18 and receives the beam of light 12. An objective lens 28 directs the beam of light 12 to a reflective means 30. The objective lens 28 is located in front of the view aperture 26 and in front of the reflector 30. The objective lens is received in the housing shell 24 and, in its simplest construction, is a standard objective lens.

Reflector 30 may be a first first mirror or a prism and is a means for reflecting the beam of light 12 so that focal plane falls on a pellicle surface 38. A protective element subassembly 34 is provided with the pellicle surface 38 which is partially reflective. The partially reflective pellicle surface 38 is located between a secondary absorbing portion 39 of the pellicle 36 and the first surface mirror or prism 30. The pellicle surface 38 has a pellicle substrate 40 which has a high absorption characteristic which is black dyed for broad band light absorption. The surface 38 has a thickness of less than 300 A, while the pellicle substrate 40 has a thickness less than 2 microns. Thus, prompt vaporization of the pellicle under laser irradiation is ensured.

The partially reflective pellicle surface 38 is constructed and arranged to reflect light of harmless intensity, or the harmless component 14, represented by dotted lines, through a roof prism 47, to an eyepiece lens 48, and to absorb and be destroyed at the point 32 when it is impinged by a somewhat collimated beam of light of harmful intensity, or the harmful component 16. Dectection means or a detector 50 is for detecting the presence of the harmful component 16 of the beam of light 12. The eyepiece lens 48 refocuses the harmless component 14 of the light beam 12 for viewing in substantially undistored form.

The pellicle 36 is partially absorbing, on the order of 20% to 40%, and partially reflecting. The reflective surface 38 is typically constructed of aluminum and can reflect 88% of the incoming light.

In FIG. 2, a second, preferred embodiment is shown. Similar to the embodiment shown in FIG. 1 in most respects, the embodiment of FIG. 2 has a protective element subassembly 34 that is further provided with removal means 52. Thus, the subassembly 34 has a cartridge 54 having the pellicle 36 and surface 38. The pellicle substrate 40 is provided thereon. The absorbing material 39 is contained in the lower portion of the cartridge 54.

The cartridge 54 is provided with removal means 52 by having a threaded circumference 56 about the periphery of the cartridge 54. Receiving threads 58 receive the threaded circumference 56 and are constructed and arranged so that the cartridge 54 can be removed from the apparatus 10 by unscrewing it. Replacement cartridges (not shown) of like construction can be screwed into place.

Thus, the beam of light 12 enters the apparatus 10 at the forward end 20 and is thereafter received by the view aperture 26. The light 12 passes through the objective lens means 28, is directed to the mirror or prism 30. The focal point of a harmful, collimated beam 16 then falls onto some point 32 on the pellicle surface 38 of the protective element subassembly 34. Light of harmless intensity 14 is reflected by the pellicle surface 38 through the erection prism 47 to the eyepiece lens means 48 and is refocused for viewing.

A portion of any intermittent harmful component 16 of the light 12 is absorbed by pellicle surfaces 38, destroying that point of the surface 38. Whereupon, the beam 12 is transmitted through the pellicle to be absorbed by the absorbing portion 39 of the protective element subassembly 34.

The preferred embodiments of the present invention are now described in such full, clear, concise and exact terms as to enable a person of skill in the art to make, use and/or practice the same. To particularly point out and distinctly claim the subject matter regarded as invention, the following claims conclude this specification.

What is claimed is:

1. A light protection apparatus for receiving a beam of light having a harmless component and a harmful component, the apparatus comprising:

a light protection housing having a front forward end and a rear viewing end;

a view aperture located at said viewing end;

an eye piece lens means mounted at said viewing end relative to said view aperture;

objective lens means mounted at said forward end for receiving and directing said beam of light into said housing;

a reflective means mounted in said housing for reflecting said beam of light upon its passing through said objective lens means;

a protective element subassembly having an absorbing portion and a reflective pellicle surface, said protective element subassembly being mounted in said housing so that the reflective pellicle surface interposes the absorbing portion and the reflective means, the reflective pellicle surface being constructed and arranged relative to said reflective means (i) to reflect the harmless component of the beam of light to said eyepiece lens means and (ii) to be destroyed at the point where said pellicle surface is contacted by the harmful component of the beam of light for passing the harmful component to said absorbing portion and preventing the reflection of the harmful component to said eyepiece lens means, said protective element subassembly including removal means cooperating with said housing for permitting the removal of said subassembly from said housing;

said eyepiece lens means for refocusing the harmless component of the light beam for viewing in a substantially undistorted form.

2. A light protection apparatus according to claim 1 wherein said removable means includes a plurality of threads for screw securing said subassembly to said housing.

3. A light protection apparatus for receiving a beam of light having a harmless component and a harmful component, the apparatus comprising:

a light protection housing having a front forward end and a rear viewing end;

a view aperture located at said viewing end;

an eye piece lens means mounted at said viewing end relative to said view aperture;

objective lens means mounted at said forward end for receiving and directing said beam of light into said housing;

a reflective means mounted in said housing for reflecting said beam of light upon its passing through said objective lens means;

a protective element subassembly having an absorbing portion and a reflective pellicle surface, said protective element subassembly being mounted in said housing so that the reflective pellicle surface interposes the absorbing portion and the reflective means, the reflective pellicle surface being constructed and arranged relative to said reflective means (i) to reflect the harmless component of the beam of light to said eyepiece lens means and (ii) to be destroyed at the point where said pellicle surface is contacted by the harmful component of the beam of light for passing the harmful component to said absorbing portion and preventing the reflection of the harmful component to said eyepiece lens means;

said eyepiece lens means for refocusing the harmless component of the light beam for viewing in a substantially undistorted form; and detection means for detecting the presence of the harmful component of the light.

4. A light protection apparatus according to claim 1 wherein said detection means includes a laser detector operatively associated to signal the user of the presence of a laser.

* * * * *